United States Patent
Henry et al.

(10) Patent No.: US 10,378,411 B1
(45) Date of Patent: Aug. 13, 2019

(54) DOSING METHOD AND APPARATUS FOR REDUCTANT UREA SOLUTIONS WITH CATALYST PRECURSORS TO ASSIST SELECTIVE CATALYTIC REDUCTION

(71) Applicant: Southwest Research Institute, San Antonio, TX (US)

(72) Inventors: Cary A. Henry, Helotes, TX (US); Ryan C. Hartley, Kerrville, TX (US)

(73) Assignee: SOUTHWEST RESEARCH INSTITUTE, San Antonio, TX (US)

( * ) Notice: Subject to any disclaimer, the term of this patent is extended or adjusted under 35 U.S.C. 154(b) by 0 days.

(21) Appl. No.: 15/861,208

(22) Filed: Jan. 3, 2018

(51) Int. Cl.
*F01N 3/20* (2006.01)
*B01D 53/94* (2006.01)
*C01C 1/08* (2006.01)
*B01J 21/06* (2006.01)
*B01J 31/22* (2006.01)

(52) U.S. Cl.
CPC ......... *F01N 3/208* (2013.01); *B01D 53/9418* (2013.01); *B01J 21/063* (2013.01); *B01J 21/066* (2013.01); *B01J 31/2204* (2013.01); *B01J 31/2234* (2013.01); *C01C 1/08* (2013.01); *C01C 1/086* (2013.01); *B01D 2255/20707* (2013.01); *B01D 2255/20715* (2013.01); *F01N 2610/01* (2013.01); *F01N 2610/02* (2013.01)

(58) Field of Classification Search
CPC .... B01D 2257/404; B01D 2255/20707; B01D 2251/21; B01D 2251/206; B01D 2258/012; B01D 53/94; B01D 53/9422; B01D 53/9418; F01N 2610/102; F01N 2610/02; F01N 2610/01; F01N 2570/14; F01N 2550/05; F01N 2240/25; F01N 3/2073; B01J 37/086; B01J 31/12; B01J 21/063; B01J 21/06; C01C 1/086
See application file for complete search history.

(56) References Cited

U.S. PATENT DOCUMENTS 5,087,431 A  2/1992  Gardner-Chavis et al.
5,171,558 A  12/1992  Gardner-Chavis et al.
(Continued)

FOREIGN PATENT DOCUMENTS

EP  0 894 523 A1  2/1999
FR  304 4564 A1  6/2017
(Continued)

OTHER PUBLICATIONS

"Synthesis of Superfine Titania via High-Temperature Hydrolysis . . . " D. A. Matolygina et al., vol. 441, Part 2, pp. 361-364, Doklady Chemistry, ISSN 0012-5008, Pleiades Publishing Ltd., Dec. 2011. (Year: 2011).*

(Continued)

*Primary Examiner* — Timothy C Vanoy (74) *Attorney, Agent, or Firm* — Tucker Grossman (57) ABSTRACT

The present disclosure is directed at a dosing method and apparatus for treatment of reductant urea solutions with water soluble organometallic catalyst precursors which convert to active catalyst compounds in diesel exhaust gas systems. The active catalysts then promote hydrolysis of isocyanic acid into ammonia and/or decomposition of relatively high molecular weight deposits which deposits may otherwise reduce selective catalytic reduction efficiency.

24 Claims, 4 Drawing Sheets

(56) References Cited

U.S. PATENT DOCUMENTS

| | | | |
|---|---|---|---|
| 5,342,599 A | | 8/1994 | Slone |
| 5,827,490 A | | 10/1998 | Jones |
| 6,024,774 A | | 2/2000 | Nakagawa et al. |
| 6,203,770 B1 | | 3/2001 | Peter-Hoblyn et al. |
| 6,361,754 B1 | | 3/2002 | Peter-Hoblyn et al. |
| 7,572,318 B2 | | 8/2009 | Jadhav et al. |
| 7,708,806 B2 | | 5/2010 | Wright et al. |
| 7,744,845 B2 | | 6/2010 | Stephenson |
| 7,909,911 B2 | | 3/2011 | Lackner et al. |
| 7,938,893 B2 | | 5/2011 | Doong et al. |
| 8,083,836 B2 | | 12/2011 | Wright et al. |
| 8,088,197 B2 | | 1/2012 | Wright et al. |
| 8,163,065 B2 | | 4/2012 | Lackner et al. |
| 8,176,731 B2 | * | 5/2012 | Doring .................. F01N 13/011 60/297 |
| 8,337,589 B2 | | 12/2012 | Wright et al. |
| 8,454,732 B2 | | 6/2013 | Huang et al. |
| 2004/0040288 A1 | * | 3/2004 | Jacob ................. B01D 53/8631 60/286 |
| 2009/0101008 A1 | | 4/2009 | Lackner et al. |
| 2009/0269265 A1 | * | 10/2009 | Ando ..................... B01D 53/90 423/239.2 |
| 2011/0268636 A1 | | 11/2011 | Lackner et al. |
| 2013/0064724 A1 | | 3/2013 | Huang et al. |
| 2014/0369910 A1 | | 12/2014 | Ayyappan et al. |
| 2016/0051931 A1 | * | 2/2016 | Ito ........................ B01J 37/0244 422/180 |
| 2016/0074809 A1 | | 3/2016 | Goffe |

FOREIGN PATENT DOCUMENTS

| | | |
|---|---|---|
| JP | 2013541662 A | 11/2013 |
| WO | 2012104205 A1 | 8/2012 |

OTHER PUBLICATIONS

Bernhard, et al; Catalytic Urea Hydrolysis in the Selective Catalytic Reduction of NOx: Catalyst Screening and Kinetics on Anatase TiO2 and ZrO2; The Royal Society of Chemistry, 2013, Catalysis Science & Technology, vol. 3, pp. 942-951.

Bernhard, et al; "Hydrolysis and Thermolysis of Urea and its Decomposition Byproducts Biuret, Cyanuric Acid and Melamine Over Anatase TiO2"; Applied Catalysis B: Environmental vol. 115-116, (2012) pp. 129-137.

Engine and Aftertreatment Technologies—Lubrizol <<https://www.lubrizol.com/Lubricant-and-Fuel-Additives/Engine-Oil>> accessed Mar. 7, 2018.

Hauck, et al; "Surface Chemistry and Kinetics of the Hydrolysis of Isocyanic Acid on Anatase"; ScienceDirect; Applied Catalysis B: Environmental 70, 2007, pp. 91-99.

Ida, et al., "Mechanism of High-Temperature CO2 Sorption on Lithium Zirconate," Environ. Sci. Technol., 2003, 37(9), pp. 1999-2004.

Johnson, T.V.; "Diesel Emissions in Review"; SAE International, 2011-01-0304; Published Apr. 12, 2011 (15 pgs).

Kleemann, M., et al; "Hydrolysis of Isocyanic Acid on SCR Catalysts";—Ind. Eng. Chem Res. 2000, vol. 39, pp. 4120-4126.

Majewski; "Selective Catalytic Reduction"; DieselNet Technology Guide, Diesel Catalysts; <<https://www.dieselnet.com/tech/cat_scr.php>> (accessed Aug. 30, 2016).

Matolygina, et al; "Synthesis Of Superfine Titania via High-Temperature Hydrolysis of Titanium (IV) Bis(ammonium lactato) Dihydroxide"; Doklady Chemistry: vol. 441 Part 2, pp. 361-364, Nov. 2011.

Nair, et al., "Lithium Based Ceramic Materials and Membranes for High Temperature CO2 Separation," Progress in Materials Science 54 (2009) 511-541.

Piazzesi, G., PhD; Thesis: "The Catalytic Hydrolysis of Isocyanic Acid (HNCO) in the Urea-SCR Process"; dissertation submitted to the Swiss Federal Institute of Technology, ETH No. 16693, Zurich, 2006 (164 pgs).

Strots, et al; "Deposit Formation in Urea-SCR Systems"; SAE International, 2009, Journal of Fuels and Lubricants., vol. 2, Issue 2, pp. 283-289.

Zahn, et al; "Catalytic Hydrolysis of S-Triazine Compounds Over Al2O3"; Catalysis Today, vol. 27 (1996), pp. 167-173.

Notice of Allowance dated Nov. 30, 2018 for U.S. Appl. No. 15/843,401 (13 pgs).

* cited by examiner

DOSING METHOD AND APPARATUS FOR REDUCTANT UREA SOLUTIONS WITH CATALYST PRECURSORS TO ASSIST SELECTIVE CATALYTIC REDUCTION

FIELD

The present disclosure is directed at a dosing method and apparatus for treatment of reductant urea solutions with water soluble organometallic catalyst precursors which convert to active catalyst compounds in diesel exhaust gas systems. The active catalysts then promote hydrolysis of isocyanic acid into ammonia and/or decomposition of relatively high molecular weight deposits which deposits may otherwise reduce selective catalytic reduction efficiency.

BACKGROUND

Internal combustion engines such as those found in cars and trucks may produce combustion byproducts and/or products of incomplete combustion which may exist in the engine exhaust and emit into the environment. Per emissions regulations, the exhaust may be treated to reduce the concentration of such products and, therefore, reduce pollution. Although spark ignition (i.e., gasoline) engines may use three-way catalytic converters to satisfy emissions regulations, compression ignition (i.e., diesel) engines typically employ two-way catalytic converters which may not efficiently reduce nitrogen oxides (NOx). Accordingly, diesel engines may include selective catalytic reduction (SCR) systems in order to seek reduction in nitrogen oxide concentrations. Improving performance of such systems remains an ongoing area of research and development.

SUMMARY

The present invention is directed to a method of reducing oxides of nitrogen in a diesel engine producing diesel exhaust. One provides a first reservoir of diesel emission fluid containing an aqueous based urea solution and a second reservoir of a catalyst precursor containing an organometallic compound dissolved in water. The diesel emission fluid and the water soluble organometallic compound are mixed and introduced into the diesel exhaust wherein the urea converts to ammonia and isocyanic acid and the catalyst precursor converts to a catalyst which converts the isocyanic acid to ammonia wherein the ammonia is provided to a selective catalytic reduction system and reacts with the oxides of nitrogen and provides nitrogen and water.

The present invention is also directed to a method of reducing oxides of nitrogen in a diesel engine producing diesel exhaust comprising providing a first reservoir of diesel emission fluid containing an aqueous based urea solution and providing a second reservoir of a catalyst precursor containing an organo-titanium compound dissolved in water and mixing said diesel emissions fluid and said organo-titanium compound dissolved in water. The urea converts to ammonia and isocyanic acid and the organo-titanium compound converts to titanium dioxide catalyst. The titanium dioxide catalyst then converts the isocyanic acid to ammonia. In addition the selective catalyst reduction system contains one or more compounds of biuret, triuret, cyanuric acid, ammelide, ammeline or melamine and the titanium dioxide catalyst promotes thermal decomposition and removal of said one or more compounds from the selective catalytic reduction system.

In apparatus form, the present invention is directed at an exhaust after-treatment system comprising a first reservoir of diesel emission fluid containing an aqueous based urea solution, a second reservoir of a catalyst precursor containing an organometallic compound dissolved in water, a selective catalyst reduction system configured to convert urea to ammonia and reduce NOx to nitrogen and water, and a dosing unit comprising a liquid injector that combines and mixes the diesel emission fluid from the first reservoir and the catalyst precursor from the second reservoir wherein the dosing unit is configured to inject the mixture into the selective catalyst reduction system.

DESCRIPTION OF THE DRAWINGS

The various aspects and advantages of the present disclosure may be better understood by reference to the following detailed description, in conjunction with the accompanying drawings, wherein.

DETAILED DESCRIPTION

Urea is used as a convenient source of ammonia ($NH_3$) reductant in SCR systems for decreasing NOx emissions from diesel engines. Urea ($H_2NCONH_2$) is therefore a component of what is termed a diesel emission fluid (DEF) that is preferably introduced as a spray into the exhaust gases upstream of the SCR catalyst. The DEF vaporizes and the urea thermally decomposes into $NH_3$ and HNCO (isocyanic acid), with subsequent hydrolysis of the HNCO into additional amounts of $NH_3$ along with $CO_2$:

The ammonia as formed above may then be utilized as the reductant in selective catalytic reduction (SCR) to reduce NOx to nitrogen and water. Such reactions include the following:

However, urea is observed to deposit on the walls of the exhaust system and/or the SCR catalyst as solid urea or as a deposit mixture of urea and isocyanic acid. Over time, in the presence of relatively hot exhaust gases, secondary reactions can occur in which such deposits (urea and isocyanic acid) convert to a range of relatively higher molecular weight compounds. Such higher molecular weight compound deposits may include one or more of the following:

TABLE 1

Deposits On Exhaust System Or SCR Catalyst

| Compound | Structure |
|---|---|
| Biuret | $H_2N-\overset{O}{\underset{\|}{C}}-\overset{H}{\underset{\|}{N}}-\overset{O}{\underset{\|}{C}}-NH_2$ |
| Triuret | (structure shown) |
| Cyanuric Acid | (structure shown) |
| Ammelide | (structure shown) |
| Ammeline | (structure shown) |
| Melamine | (structure shown) |

The deposits, once formed, then serve to reduce the efficiency of the exhaust gas treatment by either reducing exhaust gas flow and/or reducing efficiency of the SCR catalyst from efficient reaction with ammonia to reduce NOx gas concentration. In addition, although heating to elevated temperature such as in the range of 193° C. to 700° C. can serve to decompose the above identified relatively high molecular weight deposits, as well as polymeric type deposits, it can be appreciated that this adds a level of complexity to the system and potential for other associated problems.

Figure 1:
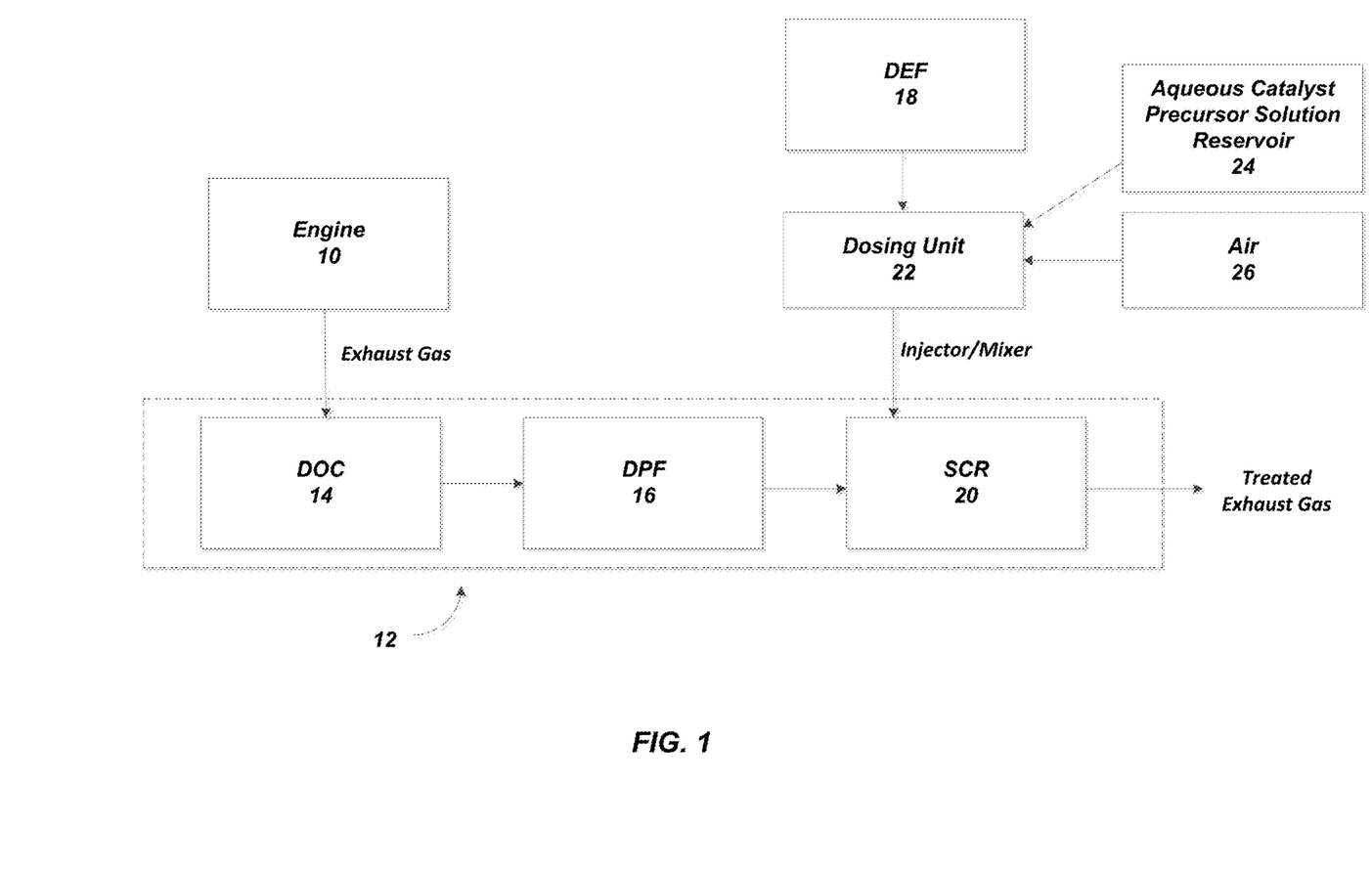
FIG. 1 illustrates in block diagram form an overview of a diesel engine outputting exhaust gas to an exhaust gas after-treatment system.

Attention is directed to FIG. 1, which provides in block diagram form an overview of a compression ignition engine 10, such as a diesel engine, outputting exhaust gas to an exhaust after-treatment system 12 which may include a diesel oxidation catalyst (DOC) 14 which connects to a diesel particulate filter (DPF) 16 which then feeds the selective catalyst reduction (SCR) system 20. A first reservoir containing diesel emission fluid (DEF) is separately provided at 18 which contains an aqueous based urea solution that can be introduced to dosing unit 22. Preferably aqueous urea based solutions that are employed typically include those having 30.0 wt. % to 40.0 wt. % urea, and preferably 32.5 wt. % urea. A second reservoir containing the separate aqueous catalyst precursor solution is shown at 24 which precursor solution can be introduced into the dosing unit 22. Preferably, a pressurized air source is provided at 26 which is also connected to dosing unit 22. The dosing unit is understood as a liquid injector/mixer which combines and mixes the DEF and the aqueous catalyst precursor solution and injects such mixture into the SCR system 20.

It is therefore useful to note that with respect to the above, one avoids the need to combine the aqueous catalyst precursor into the diesel emissions fluid or aqueous based urea solution. In that regard, it is noted that the freshly prepared urea water solution has a neutral pH, whereas urea water solutions that have been stored for relatively longer periods of time may have a pH value of 10.5 (alkaline). Such variation in pH may therefore have an impact on the stability and/or solubility of the aqueous catalyst precursors herein if incorporated directly into the urea water solution. Accordingly, as illustrated in FIG. 1, the invention herein avoids the problems encountered if the aqueous catalyst precursor is introduced directly into the DEF reservoir. As shown, the catalyst precursor is dissolved in water and separately stored in reservoir 24, and not in the first reservoir 18 containing the urea water solution. Accordingly issues of pH variation and solution alkalinity giving rise to the problem of catalyst precursor precipitation in the DEF can be reduced or avoided.

In addition, as also can be appreciated from FIG. 1, one may now adjust the particular level of catalyst precursor that is introduced into the SCR system. More specifically, the dosing unit is such that one may now introduce a relatively higher dose of catalyst precursor to the SCR system (e.g. 0.25 wt. % to 2.00 wt. % of catalyst precursor in DEF solution) at relatively low temperatures (≤250° C. or in the range 150-250° C.). One may then introduce a relatively lower dose of catalyst precursor (e.g, 0.01 wt. % to less than 0.25 wt. % in DEF solution) to the SCR system at relatively higher temperatures (>250° C. or in the range of >250° C. to 400° C.). Reference to the wt. % of the catalyst precursor in the DEF solution is provided by the following equation:

$$\frac{Wt.\ \%\ \text{Precursor In}}{DEF\ \text{Solution}} = \left\{\frac{\text{Mass of Catalyst Precursor}}{\text{Mass of Catalyst Precursor} + \text{Mass of Urea} + \text{Mass of Water}}\right\} * 100\%$$

Stated another way, the present invention allows one to introduce different levels of catalyst precursor solution to the SCR system as a function of the temperature of the SCR system 20. This can be achieved by dosing unit 22 which includes a processor that monitors the temperature of the SCR system 20 and determines the wt. % of catalyst precursor to introduce into the SCR system based on temperature measurements and stored data regarding the levels of catalyst precursor suitable for use at a selected temperature. It will be further appreciated that since the temperature of the SCR system is influenced by the exhaust temperature, the present invention also includes the ability to introduce different levels of catalyst precursor solution to the SCR system as a function of exhaust temperature.

The catalyst precursor herein is preferably one that has a requisite amount of solubility in aqueous solution within the reservoir 24 and which is capable of decomposition at temperatures similar to those that are relied upon to convert urea into ammonia. Preferably, the temperature range for decomposition of the catalyst precursor is 45° C. to 180° C., more preferably in the range of 75° C. to 125° C. Such catalyst precursors, upon decomposition at such temperatures in the exhaust gas after-treatment system will then operate to provide a target catalyst which serves to achieve one or more of the following: (1) hydrolyze the isocyanic acid to form ammonia to assist in SCR; (2) reduce and/or eliminate the build-up of relatively higher molecular weight deposits that would otherwise be formed from the isocyanic acid; and (3) decompose the relatively higher molecular weight deposit compounds found in the exhaust gas after treatment system, such as within the SCR system 20 (e.g., biuret, triuret, cyanuric acid, ammelide, ammeline, and/or melamine). This decomposition is contemplated to occur at temperatures that are lower than the temperatures that are typically relied upon for their thermal decomposition (e.g. pyrolysis) and removal.

The catalyst precursors herein preferably include water soluble organometallic compounds that will upon decomposition provide the catalytic activity noted above. Preferably, such organometallic compounds include titanium acetates such as titanium(IV) acetate ($C_8H_{12}O_8Ti$) which is water soluble and has a boiling point of 117° C. and which is therefore suitable for use as part of the diesel emission fluid. Upon heating (exposure to elevated temperature exhaust gases) the titanium(IV) acetate will decomposes to provide catalytic titanium oxide which may proceed according to the following general reaction:

$$C_8H_{12}O_8Ti + 8O_2 \rightarrow TiO_2 + 8CO_2 + 6H_2O$$

Accordingly, the titanium oxide ($TiO_2$) as the target catalyst will now conveniently serve to improve the exhaust gas treatment by hydrolyzing the isocyanic acid present to ammonia in order to reduce and/or eliminate the build-up of relatively higher molecular weight deposits. In addition, as noted, the $TiO_2$ will allow for decomposition of any relatively high molecular weight deposits that may be present, and provide for such decomposition at relatively lower temperatures than ordinarily used for thermal (pyrolytic) decomposition.

Other water soluble organometallics that may be combined with the DEF are contemplated to include titanium (IV) bis(ammonium lactato)dihydroxide ($C_6H_{18}N_2O_8Ti$), which is another water soluble titanium complex and is available as a 50 wt. % in water solution (Sigma-Aldrich) with a flash point of 27° C. Accordingly, upon exposure to elevated temperatures in the exhaust gases, the following accounts for the formation of the target titanium dioxide catalyst:

$$[CH_3CH(O-)CO_2NH_4]_2Ti(OH)_2 + 6O_2 \rightarrow TiO_2 + 6CO_2 + 6H_2O + 2NH_3$$

Another candidate catalyst precursor is contemplated to include titanium(III)oxalate decahydrate ($Ti_2(C_2O_4)_3 \cdot 10H_2O$). It may therefore be appreciated the preferably, the catalyst precursor may therefore comprise one or more of titanium(IV) acetate, Ti(IV)bis(ammonium lactato)dihydroxide or titanium(III)oxalate. Accordingly, mixtures of such water soluble organometallic catalyst precursors may be employed.

Other preferred catalyst precursors are contemplated to include ammonium titanyl oxalate (ATO), $C_4O_9N_2H_8Ti$, having the following structure:

A still further preferred precursor includes titanium oxyacetylacetonate, $C_{10}H_{14}O_5Ti$ having the following structure:

A still further preferred precursor includes $Zr^{4+}$ compounds such as zirconia dioxide ($ZrO_2$). Similar to $TiO_2$ disclosed above, it is contemplated that $ZrO_2$ can similarly serve to improve the exhaust gas treatment by hydrolyzing the isocyanic acid present to ammonia:

It is therefore contemplated herein that with respect to a given urea-water solution containing a catalyst precursor comprising a water soluble organometallic compound, such as an organometallic compound as noted above that decomposes to form $TiO_2$, one may include a $Zr^{4+}$ type compound, such as $ZrO_2$. As may now be appreciated, in the event that isocyanic acid deposits are formed on the walls of the exhaust system or SCR catalyst, the $ZrO_2$ can additionally serve to reduce such deposits and improve SCR performance.

Therefore, in the broad context of the present disclosure, the organometallic compounds are preferably selected from organo-titanium compounds, which as noted have solubility in water, wherein the solubility is preferably at a level sufficient to allow the organo-titanium compound, as the catalyst precursor, to decompose in the exhaust gases and provide a sufficient amount of catalyst ($TiO_2$) to then hydrolyze the isocyanic acid present to ammonia. Such water solubility of the organometallic compound catalyst precursor in water is contemplated to be at a level of 0.1 wt. % to 50.0 wt. %, more preferably in the range of 10.0 wt. % to 50.0 wt. %, as well as 25.0 wt. % to 50.0 wt. %. The solubility is such that it is contemplated to be maintained at a temperature range between −11° C. (the freezing point of a 32.5% urea water solution) and 50° C.

It is further contemplated the amount of catalyst, derived from the water soluble organometallic precursor, is then preferably formed in the exhaust after-treatment system 12 at a level of 0.01 wt. % to 2.0 wt. % within the DEF comprising the aqueous urea solution. Accordingly, one may preferably employ an amount of, e.g. titanium(IV) acetate ($C_8H_{12}O_8Ti$) precursor, such that upon delivery and decomposition to titanium oxide in the exhaust gas after-treatment system, the level of titanium oxide in the injected DEF is in the range of 0.01 wt. % to 2.0 wt. %.

Moreover, as alluded to above, one may optionally include $ZrO_2$ in the aqueous catalyst precursor solution reservoir 24 to augment the ability to reduce isocyanic acid deposits. Therefore, it is contemplated that the level of $ZrO_2$ in the aqueous catalyst precursor solution, either on its own or in combination with an organometallic precursor catalyst, is similarly in the range of 0.01 wt % to 1.0 wt. %.

Figure 2:
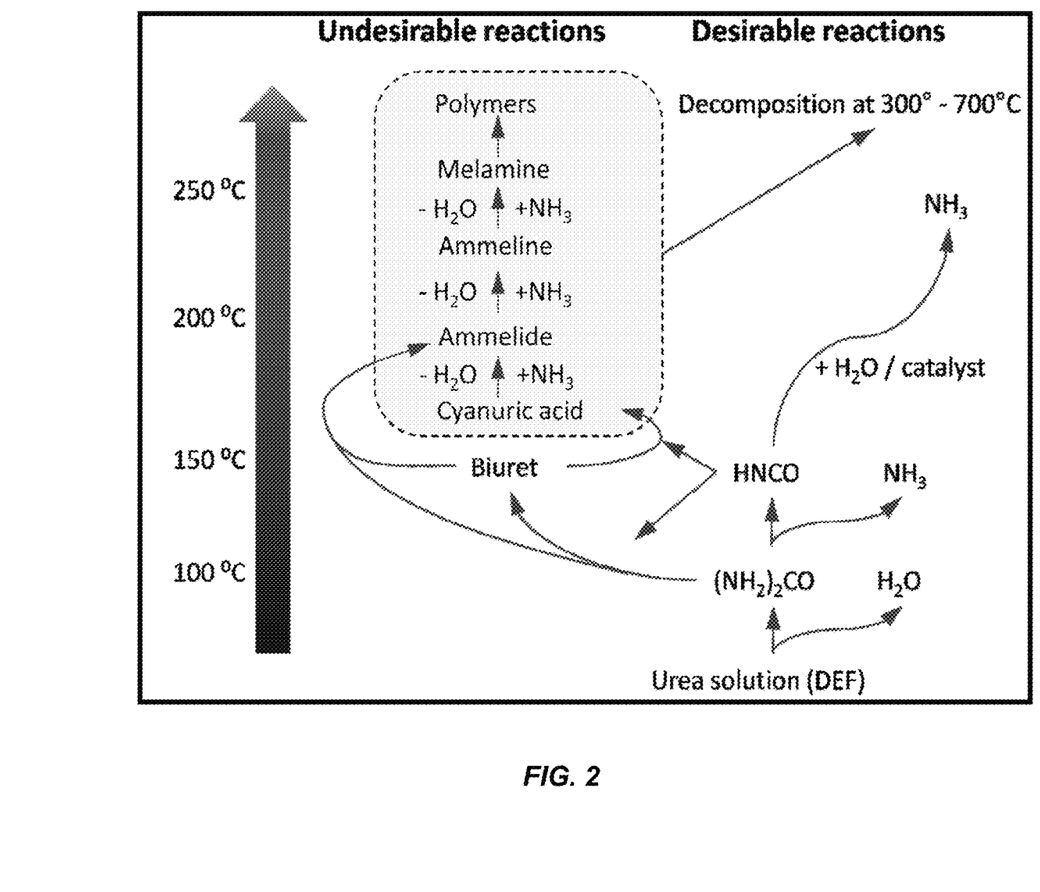
FIG. 2 illustrates the potential reactions of urea in the exhaust gas environment of a SCR system.

Attention is next directed to FIG. 2 which now provides another useful overview of the disclosure herein. As can be seen, the DEF (aqueous urea solution) upon exposure to heat from the exhaust gases (~100° C.) will decompose to provide both isocyanic acid and the desirable ammonia for feeding to the SCR system. The isocyanic acid will then be prone to convert, via what is broadly identified as an undesirable reaction pathway, to the relatively higher molecular weight compound deposits, containing one or more of biuret, cyanuric acid, ammelide, ammeline, melamine and other macromolecular and polymer type compounds. Such compounds will then compromise the efficiency of the SCR system to reduce levels of NOx.

Accordingly, by introduction of the catalyst precursor herein into the DEF as discussed above, and as shown in FIG. 2, the catalyst precursor is such that upon exposure to exhaust gases and temperatures preferably in the range of about 100° C. to 300° C., the catalyst precursor (soluble organometallic compound) is converted into catalyst (e.g. titanium oxide) and the catalyst reduces or eliminates the conversion of the isocyanic (HNCO) to the relatively high molecular weight deposits. Instead, as illustrated, the isocyanic acid is converted to additional amounts of ammonia for the SCR process. It is noted that deposit formation may be particularly prominent at temperatures in the range of 185° C. to 250° C. Accordingly, the use of the catalyst precursors herein to reduce deposition formation that occur in the temperature range of 185° C. to 250° C. is particularly advantageous.

In addition, the catalyst precursors herein can serve to facilitate a relatively lower temperature degradation of the relatively high molecular weight compounds forming the deposits comprising biuret, cyanuric acid, ammelide, ammeline and melamine, and such degradation may now occur in the temperature range of 130° C. to 300° C.

Figure 3A:
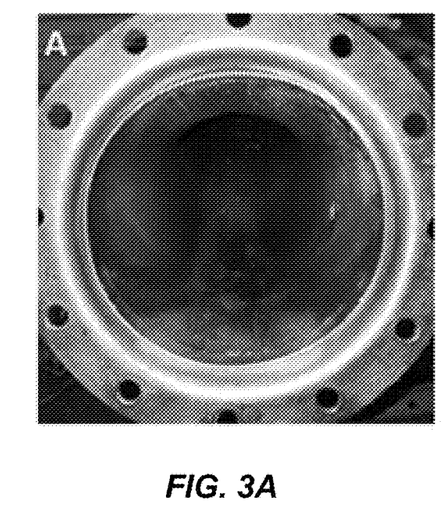
FIG. 3A illustrates the effect of ATO addition at 0.1 mol % to urea water solutions with respect to deposit formation.
Figure 3B:
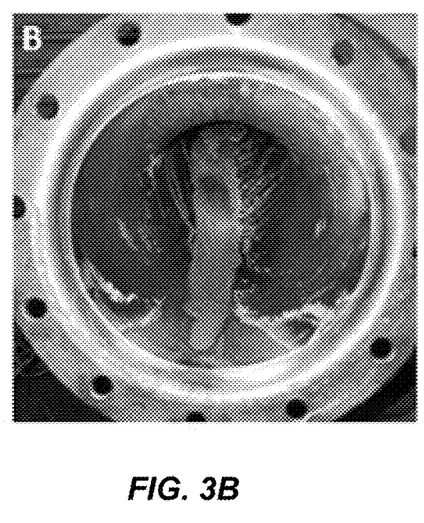
FIG. 3B illustrates the effect of ATO addition at 0.05 mol % to urea water solutions with respect to deposit formation.
Figure 3C:
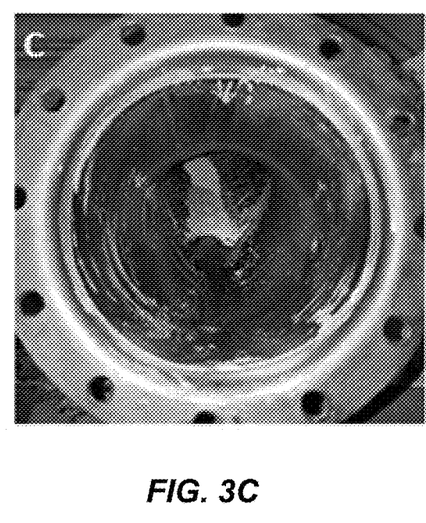
FIG. 3C illustrates the effect of urea water solution without the addition of ATO with respect to deposit formation.

Reference is next made to FIG. 3 which illustrates in identified images "A", "B" and "C" how the addition of ATO to a urea water solution can impact the formation of deposits. FIG. 3 image "A" has the highest concentration of ATO at 0.1 mol % (1.74 g ATO/liter UWS). FIG. 3 image "B" has a concentration of 0.05 mol % ATO, (0.87 g ATO/liter UWS). FIG. 3 image "C" is UWS without addition ATO. It is apparent that increasing the concentration of ATO incorporated into the UWS results in a decrease in the amount of formed deposits.

Figure 4:
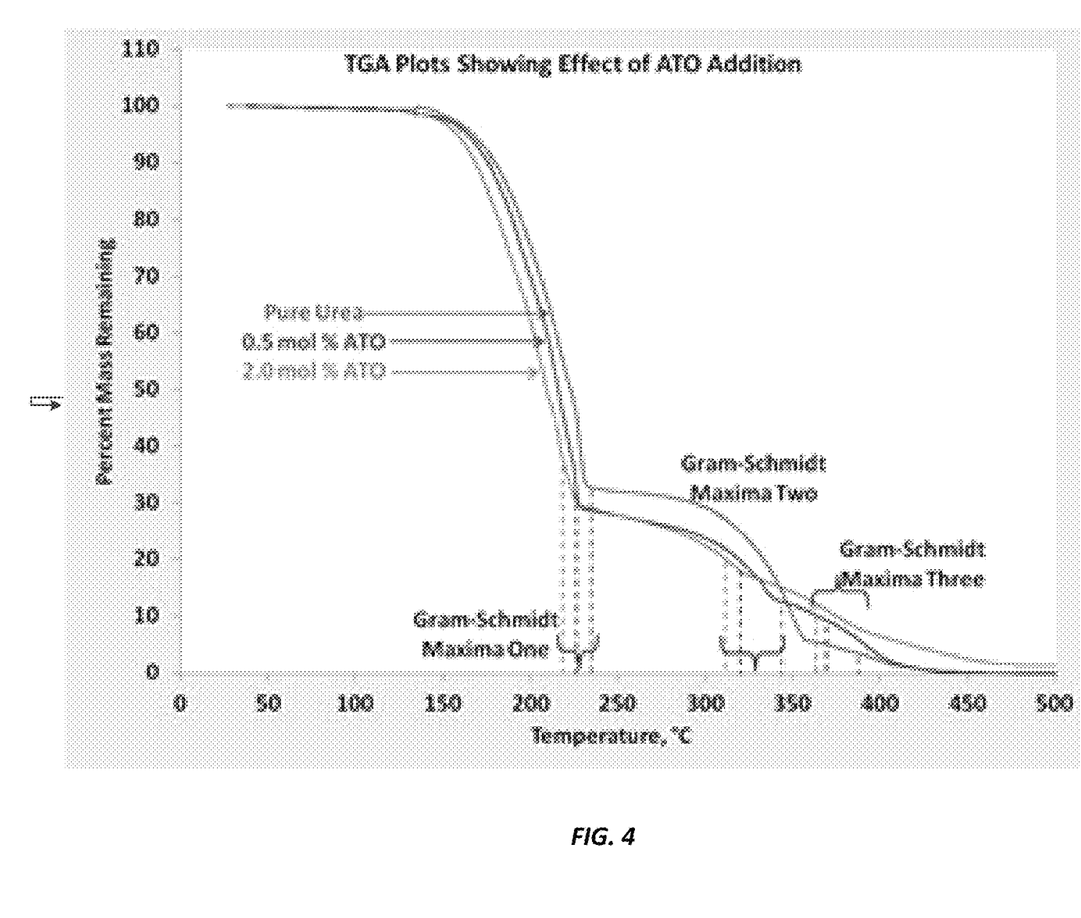
FIG. 4 illustrates the effect of ATO addition to urea water solutions evaluated by thermogravimetric analysis (TGA).

Reference is next made to FIG. 4 which identifies the use of thermogravimetric analysis (TGA) coupled to a Fourier Transform Infrared (FTIR) spectrophotometer. Samples were prepared by incorporating the identified concentration of ATO with urea via lyophilization (freeze drying). Samples then underwent TGA and the evolved gases were analyzed using IR spectroscopy. FIG. 4 shows the overlaid TGA data from three samples: pure urea, 0.5 mol % ATO in urea, and 2.0 mol % ATO in urea. The Gram-Schmidt values shown in the plot are an indication of the temperature at which the maximum amounts of gasses from the sample were evolved. As a general trend, the maximum off-gassing events occurred at lower temperatures as the concentration of ATO in the sample increased. The decrease in the temperatures of Gram-Schmidt maxima indicates that ATO catalyzes the overall decomposition of urea as given by the following reaction:

$$CO(NH_2)_2 + H_2O \rightarrow 2NH_3 + CO_2$$

An addition testing evaluation was run to further confirm the use of the catalyst precursors herein to reduce deposits. Two conditions were considered. Condition 1 consisted of a moderate duty cycle injection at relatively low temperature. More specifically, a DEF injector duty cycle of 13.1%, a target gas temperature of 215° C., engine speed of 1375 rpm, exhaust flow of 670 kg/hr for a time of 1.0 hour. Condition 2 consisted of a high duty cycle injection at high temperature. In both cases after 1.0 hour the exhaust pipe was disassembled and deposits were collected and weighed.

For Condition 1, and utilizing a DEF, namely a urea water solution, after 1.0 hour of operation 0.4 g of deposits were recovered from the mixer region and 4.2 g were recovered from the elbow region, with a total amount of deposits of 4.6 g. By contrast, when using 0.2 mol. % ATO in the same urea water solution, only 0.2 g of deposits were recovered from the mixer region and only 0.7 g of deposits were recovered from the elbow region for a total mass of recovered deposits of 0.9 g. As may therefore be appreciated, in the absence of the ATO catalyst precursor the deposit mass increased 411% (0.9 g versus 4.6 g). For Condition 2, and again utilizing a urea water solution, after 1.0 hour of operation, 6.4 g of deposits were recovered from the mixer region. By contrast, when using 0.2 mol. % ATO in the same urea water solution, only 3.5 g of deposits were recovered from the mixer region. As may therefore be appreciated, in the absence of the ATO catalyst precursor the deposit mass increased 45% (6.4 g versus 3.5 g).

Accordingly, some of the remarkable benefits of the aforementioned use of the catalyst precursors herein therefore includes the ability to now improve emissions by allowing for DEF injection at relatively lower exhaust temperatures (e.g. 185° C. to 250° C.) to then reduce deposit formation that otherwise compromises the efficiency of the SCR system. In other words, the catalyst precursors herein will provide for reduced cold start emissions on vehicles equipped with a SCR catalyst. In addition, the reduction in deposit formation as described herein is such that it is contemplated to reduce system backpressure. System backpressure in turn results in an increase in fuel consumption. By reducing deposits there will therefore be a reduction in fuel consumption in the vehicle. In addition, by reducing deposits, the requirement for a high temperature regeneration period to breakdown and remove the deposits can be reduced or avoided. Furthermore, the identified high molecular weight deposits herein are such that they tend to have corrosive effects when in contact with the metals utilized in exhaust piping. Reduction or removal of such deposits therefore is contemplated to extend the lifetime of the metallic exhaust system and reduce or eliminate loss of its structural integrity.

The invention claimed is:

1. A method of reducing oxides of nitrogen in a diesel engine producing diesel exhaust comprising:
   providing a first reservoir of diesel emission fluid containing an aqueous based urea solution;
   providing a second reservoir of a catalyst precursor containing an organometallic compound dissolved in water;
   mixing said diesel emission fluid and said water soluble organometallic compound and introducing said mixture into said diesel exhaust wherein the urea converts to ammonia and isocyanic acid and said catalyst precursor converts to a catalyst;

converting the isocyanic acid to ammonia with said catalyst wherein the ammonia is provided to a selective catalytic reduction system and reacts with the oxides of nitrogen and provides nitrogen and water.

2. The method of claim 1 wherein said selective catalyst reduction system contains one or more compounds of biuret, triuret, cyanuric acid, ammelide, ammeline or melamine and said catalyst promotes thermal decomposition and removal of said one or more compounds from said selective catalytic reduction system.

3. The method of claim 2 wherein said thermal decomposition occurs at a temperature of 130° C. to 300° C.

4. The method of claim 1 wherein said catalyst precursor converts to a catalyst at a temperature of 45° C. to 180° C.

5. The method of claim 1 wherein said catalyst precursor converts to a catalyst at a temperature of 75° C. to 125° C.

6. The method of claim 1 wherein said water soluble organometallic precursor is soluble in water at a level of 0.1 wt. % to 50.0 wt. %.

7. The method of claim 1 wherein said water soluble organometallic precursor comprises an organo-titanium compound which converts to a titanium oxide catalyst.

8. The method of claim 7 wherein said titanium oxide is formed at a concentration of 0.01 wt. % to 2.0 wt. % in said diesel emissions fluid.

9. The method of claim 7 wherein said water soluble organo-titanium compound comprises titanium(IV) acetate.

10. The method of claim 7 wherein said water soluble organo-titanium compound comprises titanium(IV) bis(ammonium lactato)dihydroxide.

11. The method of claim 7 wherein said water soluble organo-titanium compound comprises titanium(III)oxalate.

12. The method of claim 7 wherein said water soluble organo-titanium compound comprises ammonium titanyl oxalate.

13. The method of claim 7 wherein said water soluble organo-titanium compound comprises titanium oxyacetylacetonate.

14. The method of claim 1 wherein said aqueous catalyst precursor solution contains zirconium dioxide.

15. The method of claim 1 further comprising introducing different levels of said catalyst precursor to said selective catalytic reduction system as a function of temperature of the selective catalytic reduction system.

16. The method of claim 1 further comprising introducing catalyst precursor at a level of 0.25 wt. % to 2.00 wt. % dissolved in said diesel emission fluid when said SCR system is at a temperature of ≤250° C. and introducing catalyst precursor at a level of 0.01 wt. % to less than 0.25 wt. % dissolved in said diesel emission fluid when said SCR system is at a temperature of >250° C.

17. A method of reducing oxides of nitrogen in a diesel engine producing diesel exhaust comprising:
providing a first reservoir of diesel emission fluid containing an aqueous based urea solution;
providing a second reservoir of a catalyst precursor containing an organo-titanium compound dissolved in water;
mixing said diesel emissions fluid and said organo-titanium compound dissolved in water wherein the urea converts to ammonia and isocyanic acid and said organo-titanium compound converts to titanium dioxide catalyst;
wherein said titanium dioxide catalyst converts said isocyanic acid to ammonia; and
said selective catalyst reduction system contains one or more compounds of biuret, triuret, cyanuric acid, ammelide, ammeline or melamine and said titanium dioxide catalyst promotes thermal decomposition and removal of said one or more compounds from said selective catalytic reduction system.

18. The method of claim 17 wherein said organo-titanium compound comprises titanium(IV) acetate.

19. The method of claim 17 wherein said organo-titanium compound comprises titanium(IV) bis(ammonium lactato) dihydroxide.

20. The method of claim 17 wherein said organo-titanium compound comprises titanium(III)oxalate.

21. The method of claim 17 wherein said water soluble organo-titanium compound comprises ammonium titanyl oxalate.

22. The method of claim 17 wherein said water soluble organo-titanium compound comprises titanium oxyacetylacetonate.

23. The method of claim 17 wherein said aqueous catalyst precursor solution contains zirconium dioxide.

24. An exhaust after-treatment system comprising:
a first reservoir of diesel emission fluid containing an aqueous based urea solution;
a second reservoir of a catalyst precursor containing an organometallic compound dissolved in water;
a selective catalyst reduction system configured to convert urea to ammonia and reduce NOx to nitrogen and water; and
a dosing unit comprising a liquid injector that combines and mixes said diesel emission fluid from said first reservoir and said catalyst precursor from said second reservoir wherein said dosing unit is configured to inject said mixture into said selective catalyst reduction system.

* * * * *